(12) United States Patent
Bai et al.

(10) Patent No.: US 10,907,950 B1
(45) Date of Patent: Feb. 2, 2021

(54) LASER HETERODYNE INTERFEROMETRIC APPARATUS AND METHOD BASED ON PLANE MIRROR REFLECTION

(71) Applicant: NATIONAL INSTITUTE OF METROLOGY, Beijing (CN)

(72) Inventors: Yang Bai, Beijing (CN); Zheng Kun Li, Beijing (CN); Yun Feng Lu, Beijing (CN); Zhong Hua Zhang, Beijing (CN); Qing He, Beijing (CN)

(73) Assignee: National Institute of Metrology, Beijing (CN)

( * ) Notice: Subject to any disclaimer, the term of this patent is extended or adjusted under 35 U.S.C. 154(b) by 0 days.

(21) Appl. No.: 16/957,677

(22) PCT Filed: Feb. 27, 2019

(86) PCT No.: PCT/CN2019/076270
§ 371 (c)(1),
(2) Date: Jun. 24, 2020

(87) PCT Pub. No.: WO2019/210734
PCT Pub. Date: Nov. 7, 2019

(30) Foreign Application Priority Data

May 2, 2018 (CN) .......................... 2018 1 0408811

(51) Int. Cl.
*G01B 9/02* (2006.01)
(52) U.S. Cl.
CPC ..... *G01B 9/02007* (2013.01); *G01B 9/02058* (2013.01); *G01B 2290/45* (2013.01); *G01B 2290/70* (2013.01)
(58) Field of Classification Search
CPC ............ G01B 9/02007; G01B 9/02058; G01B 2290/45; G01B 2290/70
See application file for complete search history.

(56) References Cited

U.S. PATENT DOCUMENTS

| 5,321,502 A * | 6/1994 | Matsumoto ........... G03F 9/7049 |
| | | 356/490 |
| 5,818,588 A * | 10/1998 | Matsumoto ............ G01D 5/266 |
| | | 356/487 |

(Continued)

FOREIGN PATENT DOCUMENTS

| CN | 101493311 A | 7/2009 |
| CN | 102853769 A | 1/2013 |

(Continued)

OTHER PUBLICATIONS

Yang, Bai; "Study on Methodology of Measuring Relative Position of Coil Group in Energy Balance Quality Quantized Benchmark"; Chinese Doctoral Dissertations Full-text Database Engineering Technology vol. II, Issue 1, Jan. 31, 2018, 40 pages.

*Primary Examiner* — Michael A Lyons
(74) *Attorney, Agent, or Firm* — Muncy, Geissler, Olds & Lowe, P.C.

(57) ABSTRACT

Disclosed are a laser heterodyne interferometric apparatus based on plane mirror reflection and a corresponding method. The interferometric apparatus includes a dual-frequency laser, a first photoelectric receiver, a second photoelectric receiver, a first polarizing beamsplitter, a second polarizing beamsplitter, a third polarizing beamsplitter, a quarter-wave plate, a right angle mirror, an optical compensator, and a measured plane mirror. The method performs heterodyne interferometry with two spatially separated beams of different frequencies and balances the optical path lengths of the measurement beam and the reference beam with the optical compensator. In the method, the measured plane mirror moves back and forth along the propagation direction of the input beams. The disclosure suppresses optical non-linearity and optical thermal drift in laser het- (Continued)

erodyne interferometry, simplifies the optical path structure, and improves accuracy of laser heterodyne interferometry.

3 Claims, 1 Drawing Sheet

(56) References Cited

U.S. PATENT DOCUMENTS

| | | | | |
|---|---|---|---|---|
| 6,122,058 A * | 9/2000 | Van Der Werf | ... | G01B 9/02007 356/485 |
| 9,587,927 B2 * | 3/2017 | Tan | ... | G01B 9/02007 |

FOREIGN PATENT DOCUMENTS

| | | |
|---|---|---|
| CN | 103499384 A | 1/2014 |
| CN | 103743336 A | 4/2014 |
| CN | 105571529 A | 5/2016 |
| CN | 107192336 A | 9/2017 |
| CN | 105823422 B | 8/2018 |
| CN | 108592800 A | 9/2018 |
| JP | 2000146516 A | 5/2000 |
| WO | WO-2010/030179 A1 | 3/2010 |

* cited by examiner

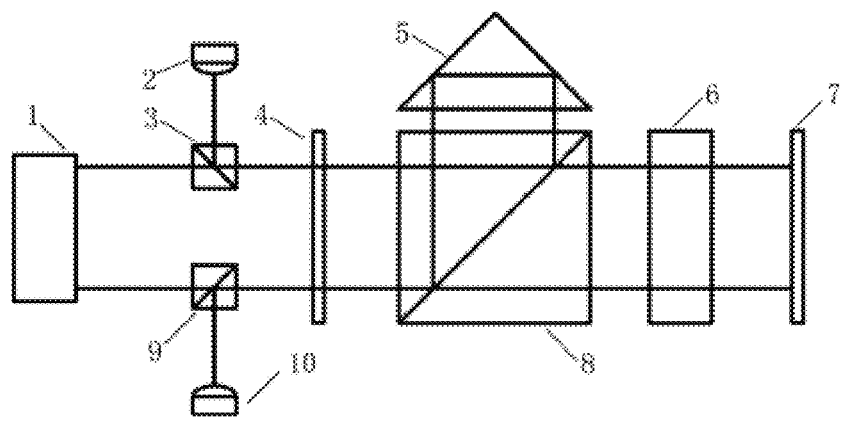

LASER HETERODYNE INTERFEROMETRIC APPARATUS AND METHOD BASED ON PLANE MIRROR REFLECTION

FIELD

Embodiments of the present disclosure generally relate to the field of laser interferometry, and more particularly relate to a laser heterodyne interferometric apparatus based on plane mirror reflection and a corresponding method.

BACKGROUND

Laser heterodyne interferometry, which has been applied in a wide array of fields such as ultra-precision measurement of geometric parameters, fast and ultra-precision positioning, and ultra-precision machining, etc., plays an increasingly important role in measurement traceability and scientific research. However, conventional laser heterodyne interferometric methods can hardly avoid crosstalk between dual-frequency beams; besides, they further introduce nanoscale nonlinearity, presence of which renders it difficult to further improve measurement accuracy. Although a heterodyne interferometric method with spatially separated input beams has been proposed to reduce nonlinearity, such methodology has a complex optical path structure and easily causes optical thermal drift, which restricts further improvement of the accuracy of laser heterodyne interferometry.

For example, an improved heterodyne interferometric method with spatially separated beams was proposed by Yang Hongxing et al. in *Nonlinearity of a Double-Path Interferometer Qualified with a Non-Constant Moving Speed*, Optics Letters, Vol. 41, No. 23, 2016:5478-5481. That method uses spatially separated input beams to reduce crosstalk between dual-frequency beams and thereby suppress optical nonlinearity, and uses an all-fiber mechanism to mitigate impacts on measurement results due to external oscillation. However, such methodology also has a complex optical path structure and has difficulty in optical path alignment and adjustment, such that it cannot be widely applied in ultra-precision geometric measurement or ultra-precision machining.

A compact fiber-coupled heterodyne interferometric structure was proposed by S. R. Gillmer et al. in *Compact Fiber-Coupled Three Degree-Of-Freedom Displacement Interferometric for Nano positioning Stage Calibration*, Measurement Science and Technology, Vol. 25, No. 7, 2014:075205. That structure not only utilizes spatially separated input beams to reduce optical nonlinearity but also adopts a specific mechanical design to simplify optical path architecture, which thereby facilitates industrial metrology. However, the difference between measurement and reference optical path lengths would introduce optical thermal drift in case of variation of the ambient temperature, thereby degrading accuracy of heterodyne interferometry.

In view of the above, conventional laser heterodyne interferometric methods with spatially separated beams have problems such as complex optical path architecture and easy occurrence of optical thermal drift, which restricts improvement of accuracy of laser heterodyne interferometry as well as its applications in ultra-precision machining.

SUMMARY

To address the above and other problems in the prior art, the present disclosure provides a laser heterodyne interferometric apparatus based on plane mirror reflection and a corresponding method, which solves the problems such as complex optical path architecture and easy occurrence of optical thermal drift in laser heterodyne interferometry and thus enhances accuracy of laser heterodyne interferometry.

Objectives of the present disclosure are implemented through the technical solutions below:

A laser heterodyne interferometric apparatus based on plane mirror reflection comprises: a dual-frequency laser, a first photoelectric receiver, a second photoelectric receiver, a first polarizing beamsplitter, a second polarizing beamsplitter, a third polarizing beamsplitter, a quarter-wave plate, a right angle mirror, an optical compensator, and a measured plane mirror, wherein the first polarizing beamsplitter, the second polarizing beamsplitter, the quarter-wave plate, the third polarizing beamsplitter, and the optical compensator are sequentially arranged in parallel between the dual-frequency laser and the measured plane mirror; the first photoelectric receiver is disposed in the reflection direction of the first polarizing beamsplitter; the second photoelectric receiver is disposed in the reflection direction of the second polarizing beamsplitter; and the right angle mirror is disposed in the reflection direction of the third polarizing beamsplitter.

Further, the dual-frequency laser outputs two parallel beams of p polarized light, the two parallel beams of p polarized light passing through the first polarizing beamsplitter and the second polarizing beamsplitter, respectively.

Further, one beam of an emergent light outputted by the dual-frequency laser is split, after passing through the first polarizing beamsplitter, the quarter-wave plate, and the third polarizing beamsplitter, into reference beam A and measurement beam A; the other beam of emergent light outputted by the dual-frequency laser is split, after passing through the second polarizing beamsplitter, the quarter-wave plate, and the third polarizing beamsplitter, into reference beam B and measurement beam B; the reference beam A is diagonally reflected back on the third polarizing beamsplitter by the right angle mirror and is then reflected by the third polarizing beamsplitter, wherein the reflection direction of the reference beam A coincides with the direction of the measurement beam B after the measurement beam B is reflected by the measured plane mirror and transmitted through the optical compensator and the third polarizing beamsplitter, the coinciding two beams of light being reflected on the second photoelectric receiver by the second polarizing beamsplitter; and the reference beam B is diagonally reflected on the third polarizing beamsplitter by the right angle mirror and is then reflected by the third polarizing beamsplitter, wherein the reflection direction of the reference beam B coincides with the direction of the measurement beam A after the measurement beam A is reflected by the measured plane mirror and then transmitted through the optical compensator and the third polarizing beamsplitter, the coinciding two beams of light being reflected on the first photoelectric receiver by the first polarizing beamsplitter.

An interferometric method for a laser heterodyne interferometric apparatus based on plane mirror reflection comprises steps of:

a. outputting, by a dual-frequency laser, parallel linearly polarized beams of light with frequencies $f_1$ and $f_2$, respectively;

b. transmitting the linearly polarized beam with frequency $f_1$ through a first polarizing beamsplitter, and transmitting the linearly polarized beam with frequency $f_2$ through a second polarizing beamsplitter, wherein the two transmitted beams, after being subjected to a quarter-wave plate, are converted to two circularly polarized beams;

c. splitting, by a third polarizing beamsplitter, the circularly polarized beam with frequency $f_1$, into a reference beam and a measurement beam, and meanwhile, splitting, also by the third polarizing beamsplitter, the circularly polarized beam with frequency $f_2$ into a reference beam and a measurement beam;

d. diagonally reflecting the two reference beams with frequencies $f_1$ and $f_2$, which are incident on a right angle mirror, back to the third polarizing beamsplitter; meanwhile, the two measurement beams with frequencies $f_1$ and $f_2$, after being transmitted through an optical compensator, being incident on a measured plane mirror, and then returning to the third polarizing beamsplitter along the original path;

e. adjusting the right angle mirror and the measured plane mirror, such that the measurement beam with frequency $f_1$ and the reference beam with frequency $f_2$ coincide and are reflected by the first polarizing beamsplitter to a first photoelectric receiver to thereby form electric signal $I_{m1}$, and the measurement beam with frequency $f_2$ and the reference beam with frequency $f_1$ coincide and are reflected by the second polarizing beamsplitter to a second photoelectric receiver to thereby form electric signal $I_{m2}$; and f. computing the phase difference between the electric signals $I_{m1}$ and $I_{m2}$ to obtain a displacement value of the measured plane mirror.

The dual-frequency laser outputs two parallel beams of p polarized light.

The measured plane mirror is disposed on a measured object; the interferometric apparatus is adjusted to make propagation directions of the emergent beams of the dual-frequency laser parallel to the moving direction of the measured object.

The present disclosure offers the following advantageous effects: simplified optical path architecture, reduced optical nonlinearity, and resistance against optical thermal drift.

BRIEF DESCRIPTION OF THE DRAWINGS

To elucidate the technical solutions of the present disclosure or the prior art, the drawings used in describing the embodiments of the present disclosure or the prior art will be briefly introduced below. It is apparent that the drawings described only relate to some embodiments of the present disclosure. To a person of normal skill in the art, other drawings may be derived based on these drawings without exercise of inventive work, wherein:

The sole FIGURE is a schematic diagram of an interferometric apparatus and its optical path according to an embodiment of the present disclosure, where 1. dual-frequency laser; 2. first photoelectric receiver; 3. first polarizing beamsplitter; 4. quarter-wave plate; 5. right angle mirror; 6. optical compensator; 7. measured plane mirror; 8. third polarizing beamsplitter; 9. second polarizing beamsplitter; 10. second photoelectric receiver.

DETAILED DESCRIPTION OF EMBODIMENTS

Hereinafter, a laser heterodyne interferometric apparatus based on plane mirror reflection and a corresponding method provided by the present disclosure will be described in further detail with reference to the accompanying drawings and preferred embodiments. However, to a person of normal skill in the art, the present disclosure may be implemented only with a partial or whole structure or flow of the present disclosure. In order not to confuse the present disclosure, some known features will not be elaborated.

According to one aspect of the present disclosure, there is provided a laser heterodyne interferometric apparatus based on plane mirror reflection, comprising: a dual-frequency laser 1, a first photoelectric receiver 2, a second photoelectric receiver 10, a first polarizing beamsplitter 3, a second polarizing beamsplitter 9, a third polarizing beamsplitter 8, a quarter-wave plate 4, a right angle mirror 5, an optical compensator 6, and a measured plane mirror 7, wherein the first polarizing beamsplitter 3, the second polarizing beamsplitter 9, the quarter-wave plate 4, the third polarizing beamsplitter 8, and the optical compensator 6 are sequentially arranged in parallel between the dual-frequency laser 1 and the measured plane mirror 7; the first photoelectric receiver 2 is disposed in the reflection direction of the first polarizing beamsplitter 3; the second photoelectric receiver 10 is disposed in the reflection direction of the second polarizing beamsplitter 9; and the right angle mirror 5 is disposed in the reflection direction of the third polarizing beamsplitter 8.

Particularly, the dual-frequency laser 1 outputs two parallel beams of p polarized light. The photoelectric receivers may convert the received optical signals to electric signals.

One beam of emergent light outputted by the dual-frequency laser 1 is split, after passing through the first polarizing beamsplitter 3, the quarter-wave plate 4, and the third polarizing beamsplitter 8, into reference beam A (formed by reflection) and measurement beam A (formed by transmission); and the other beam of emergent light outputted by the dual-frequency laser 1 is split, after passing through the second polarizing beamsplitter 9, the quarter-wave plate 4, and the third polarizing beamsplitter 8, into reference beam B (formed by reflection) and measurement beam B (formed by transmission).

The reference beam A is diagonally reflected back on the third polarizing beamsplitter 8 by the right angle mirror 5 and is then reflected by the third polarizing beamsplitter 8 in a reflection direction coinciding with the direction of the measurement beam B after the measurement beam B is reflected the measured plane mirror 7 and transmitted through the optical compensator 6 and the third polarizing beamsplitter 8, the coinciding two beams of light being reflected on the second photoelectric receiver 10 by the second polarizing beamsplitter 9.

Likewise, the reference beam B is diagonally reflected on the third polarizing beamsplitter 8 by the right angle mirror 5 and is then reflected by the third polarizing beamsplitter 8 in a reflection direction coinciding with the direction of the measurement beam A after the measurement beam A is reflected by the measured plane mirror 7 and then transmitted through the optical compensator 6 and the third polarizing beamsplitter 8, the coinciding two beams of light being reflected on the first photoelectric receiver 2 by the first polarizing beamsplitter 3.

Displacement of the measured plane mirror may be computed based on the phase difference between the two electric signals. For example, in the compact fiber-coupled heterodyne interferometric structure proposed by S. R. Gillmer et al., the displacement value of the measured object is obtained based on the phase difference between two paths of interfering signals.

The optical compensator is configured for compensating the difference between measurement and reference optical path lengths.

According to another aspect of the present disclosure, there is provided an interferometric method for a laser heterodyne interferometric apparatus based on plane mirror reflection, comprising steps of:

a. outputting, by a dual-frequency laser 1, parallel linearly polarized beams of light with frequencies $f_1$ and $f_2$, respectively;

b. transmitting the linearly polarized beam with frequency $f_1$ through a first polarizing beamsplitter 3, and transmitting the linearly polarized beam with frequency $f_2$ through a second polarizing beamsplitter 9, wherein the two transmitted beams, after being subjected to a quarter-wave plate 4, are converted to two circularly polarized beams;

c. splitting, by a third polarizing beamsplitter 8, the circularly polarized beam with frequency $f_1$, into a reference beam and a measurement beam, and meanwhile, splitting, also by the third polarizing beamsplitter 8, the circularly polarized beam with frequency $f_2$ into a reference beam and a measurement beam;

d. diagonally reflecting the two reference beams with frequencies $f_1$ and $f_2$, which are incident on a right angle mirror 5, back to the third polarizing beamsplitter 8; meanwhile, the two measurement beams with frequencies $f_1$ and $f_2$, after being transmitted through an optical compensator 6, being incident on a measured plane mirror 7, and then returning to the third polarizing beamsplitter 8 along the original path;

e. adjusting the right angle mirror 5 and the measured plane mirror 7, such that the measurement beam with frequency $f_1$ and the reference beam with frequency $f_2$ coincide and are reflected by the first polarizing beamsplitter 3 to a first photoelectric receiver 2, the first photoelectric receiver 2 converting the received light interference signal to electric signal $I_{m1}$, and such that the measurement beam with frequency $f_2$ and the reference beam with frequency $f_1$ coincide and are reflected by the second polarizing beamsplitter 9 to a second photoelectric receiver 10, the second photoelectric receiver 10 converting the received light interference signal to electric signal $I_{m2}$; and f. computing the phase difference between the electric signals $I_{m1}$ and $I_{m2}$ to obtain a displacement value of the measured plane mirror 7.

The dual-frequency laser outputs two parallel beams of p polarized light.

Upon measurement, the measured plane mirror is placed on the measured object, and movement of the measured object should be parallel to the propagation direction of the emergent beams of the dual-frequency laser; or, the interferometric apparatus is adjusted such that emergent directions of the beams of the dual-frequency laser are parallel to the moving direction of the object.

Example 1: Measuring Displacement of Linear Guide Rail Stage (1) a plane mirror was fixed on a linear guide rail stage and moved along the linear guide rail;

(2) an interferometric optical path according to the present disclosure was constructed; a right angle mirror and an optical compensator, which were made of identical materials and had the same refractive index of n, were selected; assuming that the optical path length of the reference beam in the right angle mirror was L, the thickness of the optical compensator along the direction of the measurement beam was L/2n;

(3) the emergent directions of the two beams of light from the laser were adjusted to be parallel to the moving direction of the stage;

(4) the angle of the to-be-measured plane mirror was adjusted such that the measurement beam was vertically incident on the measured plane mirror;

(5) the angles of the third polarizing beamsplitter and the right angle mirror were adjusted such that the reference beam and the measurement beam incident on respective photoelectric receivers coincide;

(6) the photoelectric receivers converted the optical signals to corresponding electric signals;

(7) the phase difference value between two paths of electric signals was measured to obtain a corresponding displacement value.

We claim:

1. A based laser heterodyne interferometric apparatus based on plane mirror reflection, comprising: a dual-frequency laser, a first photoelectric receiver, a second photoelectric receiver, a first polarizing beamsplitter, a second polarizing beamsplitter, a third polarizing beamsplitter, a quarter-wave plate, a right angle mirror, an optical compensator, and a measured plane mirror, wherein the first polarizing beamsplitter, the second polarizing beamsplitter, the quarter-wave plate, the third polarizing beamsplitter, and the optical compensator are sequentially arranged in parallel between the dual-frequency laser and the measured plane mirror; the first photoelectric receiver is disposed in the reflection direction of the first polarizing beamsplitter; the second photoelectric receiver is disposed in the reflection direction of the second polarizing beamsplitter; and the right angle mirror is disposed in the reflection direction of the third polarizing beamsplitter;

wherein one beam of emergent light outputted by the dual-frequency laser is split, after passing through the first polarizing beamsplitter, the quarter-wave plate, and the third polarizing beamsplitter, into reference beam A and measurement beam A; the other beam of the emergent light outputted by the dual-frequency laser is split, after passing through the second polarizing beamsplitter, the quarter-wave plate, and the third polarizing beamsplitter, into reference beam B and measurement beam B; the reference beam A is diagonally reflected back on the third polarizing beamsplitter by the right angle mirror and is then reflected by the third polarizing beamsplitter, wherein the reflection direction of the reference beam A coincides with the direction of the measurement beam B after the measurement beam B is reflected by the measured plane mirror and transmitted through the optical compensator and the third polarizing beamsplitter, the coinciding two beams of light being reflected on the second photoelectric receiver by the second polarizing beamsplitter; and the reference beam B is diagonally reflected on the third polarizing beamsplitter by the right angle mirror and is then reflected by the third polarizing beamsplitter, wherein the reflection direction of the reference beam B coincides with the direction of the measurement beam A after the measurement beam A is reflected by the measured plane mirror and then transmitted through the optical compensator and the third polarizing beamsplitter, the coinciding two beams of light being reflected on the first photoelectric receiver by the first polarizing beamsplitter;

the measured plane mirror is disposed on a measured object the interferometric apparatus is adjusted to make propagation directions of the emergent beams of the dual-frequency laser parallel to the moving direction of the measured object.

2. The interferometric apparatus according to claim 1, wherein the dual-frequency laser outputs two parallel beams of p polarized light, the two parallel beams of p polarized light passing through the first polarizing beamsplitter and the second polarizing beamsplitter, respectively.

3. An interferometric method for a laser heterodyne interferometric apparatus based on plane mirror reflection, comprising steps of:

a. outputting, by a dual-frequency laser, parallel linearly polarized beams of light with frequencies $f_1$ and $f_2$, respectively;

b. transmitting the linearly polarized beam with frequency $f_1$ through a first polarizing beamsplitter, and transmitting the linearly polarized beam with frequency $f_2$ through a second polarizing beamsplitter, wherein the two transmitted beams, after being subjected to a quarter-wave plate, are converted into two circularly polarized beams;

c. splitting, by a third polarizing beamsplitter, the circularly polarized beam with frequency $f_1$, into a reference beam and a measurement beam, and meanwhile, splitting, also by the third polarizing beamsplitter, the circularly polarized beam with frequency $f_2$ into a reference beam and a measurement beam;

d. diagonally reflecting the two reference beams with frequencies $f_1$ and $f_2$, which are incident on a right angle mirror, back to the third polarizing beamsplitter; meanwhile, the two measurement beams with frequencies $f_1$ and $f_2$, after being transmitted through an optical compensator, being incident on a measured plane mirror, and then returning to the third polarizing beamsplitter along the original path;

e. adjusting the right angle mirror and the measured plane mirror, such that the measurement beam with frequency $f_1$ and the reference beam with frequency $f_2$ coincide and are reflected by the first polarizing beamsplitter to a first photoelectric receiver to thereby form electric signal $I_{m1}$, and the measurement beam with frequency $f_2$ and the reference beam with frequency $f_1$ coincide and are reflected by the second polarizing beamsplitter to a second photoelectric receiver to thereby form electric signal $I_{m2}$; and f. computing the phase difference between the electric signals $I_{m1}$ and $I_{m2}$ to obtain a displacement value of the measured plane mirror;

wherein the measured plane mirror is disposed on a measured object the interferometric apparatus is adjusted to make propagation directions of the emergent beams of the dual-frequency laser parallel to the moving direction of the measured object.

* * * * *